(12) United States Patent
Martin

(10) Patent No.: US 12,118,371 B2
(45) Date of Patent: *Oct. 15, 2024

(54) ASSISTING USERS WITH PERSONALIZED AND CONTEXTUAL COMMUNICATION CONTENT

(71) Applicant: Meta Platforms, Inc., Menlo Park, CA (US)

(72) Inventor: Scott Martin, Mill Valley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,790

(22) Filed: Dec. 21, 2021

(65) Prior Publication Data

US 2022/0113998 A1   Apr. 14, 2022

Related U.S. Application Data

(63) Continuation of application No. 16/996,196, filed on Aug. 18, 2020, now Pat. No. 11,307,880, which is a
(Continued)

(51) Int. Cl.
*G06F 9/451* (2018.01)
*G06F 3/01* (2006.01)
(Continued)

(52) U.S. Cl.
CPC .............. *G06F 9/453* (2018.02); *G06F 3/011* (2013.01); *G06F 3/013* (2013.01); *G06F 3/017* (2013.01);
(Continued)

(58) Field of Classification Search
CPC ...... G06F 9/453; G06F 16/243; G06F 16/285; G06F 16/90335; G06F 16/9038;
(Continued)

(56) References Cited

U.S. PATENT DOCUMENTS

| 1,544,305 A | 6/1925 | Fisher |
| 5,721,827 A | 2/1998 | Logan et al. |

(Continued)

FOREIGN PATENT DOCUMENTS

| CN | 101292282 A | 10/2008 |
| CN | 101375273 A | 2/2009 |

(Continued)

OTHER PUBLICATIONS

US 11,531,820 B2, 12/2022, Liu et al. (withdrawn)
(Continued)

*Primary Examiner* — Sonia L Gay
(74) *Attorney, Agent, or Firm* — McDermott Will & Emery LLP

(57) ABSTRACT

In one embodiment, a method includes receiving one or more voice inputs from a first user, determining a first language register associated with the first user based on the one or more voice inputs, selecting a second language register for a voice response based on the one or more voice inputs, generating the voice response based on the second language register, and providing the voice response in response to the one or more voice inputs.

19 Claims, 9 Drawing Sheets

Related U.S. Application Data continuation of application No. 15/966,455, filed on Apr. 30, 2018, now Pat. No. 10,782,986.

(60) Provisional application No. 62/660,876, filed on Apr. 20, 2018.

(51) Int. Cl.

| | | |
|---|---|---|
| G06F 3/16 | (2006.01) | |
| G06F 7/14 | (2006.01) | |
| G06F 16/176 | (2019.01) | |
| G06F 16/22 | (2019.01) | |
| G06F 16/23 | (2019.01) | |
| G06F 16/242 | (2019.01) | |
| G06F 16/2455 | (2019.01) | |
| G06F 16/2457 | (2019.01) | |
| G06F 16/248 | (2019.01) | |
| G06F 16/28 | (2019.01) | |
| G06F 16/33 | (2019.01) | |
| G06F 16/332 | (2019.01) | |
| G06F 16/338 | (2019.01) | |
| G06F 16/438 | (2019.01) | |
| G06F 16/903 | (2019.01) | |
| G06F 16/9032 | (2019.01) | |
| G06F 16/9038 | (2019.01) | |
| G06F 16/904 | (2019.01) | |
| G06F 16/951 | (2019.01) | |
| G06F 16/9535 | (2019.01) | |
| G06F 18/2411 | (2023.01) | |
| G06F 40/205 | (2020.01) | |
| G06F 40/295 | (2020.01) | |
| G06F 40/30 | (2020.01) | |
| G06F 40/40 | (2020.01) | |
| G06N 3/006 | (2023.01) | |
| G06N 3/08 | (2023.01) | |
| G06N 20/00 | (2019.01) | |
| G06Q 50/00 | (2024.01) | |
| G06V 20/10 | (2022.01) | |
| G06V 40/16 | (2022.01) | |
| G06V 40/20 | (2022.01) | |
| G10L 13/00 | (2006.01) | |
| G10L 13/04 | (2013.01) | |
| G10L 15/02 | (2006.01) | |
| G10L 15/06 | (2013.01) | |
| G10L 15/07 | (2013.01) | |
| G10L 15/16 | (2006.01) | |
| G10L 15/18 | (2013.01) | |
| G10L 15/183 | (2013.01) | |
| G10L 15/187 | (2013.01) | |
| G10L 15/22 | (2006.01) | |
| G10L 15/26 | (2006.01) | |
| G10L 17/06 | (2013.01) | |
| G10L 17/22 | (2013.01) | |
| H04L 12/28 | (2006.01) | |
| H04L 41/00 | (2022.01) | |
| H04L 41/22 | (2022.01) | |
| H04L 43/0882 | (2022.01) | |
| H04L 43/0894 | (2022.01) | |
| H04L 51/02 | (2022.01) | |
| H04L 51/046 | (2022.01) | |
| H04L 51/216 | (2022.01) | |
| H04L 51/52 | (2022.01) | |
| H04L 67/10 | (2022.01) | |
| H04L 67/306 | (2022.01) | |
| H04L 67/50 | (2022.01) | |
| H04L 67/53 | (2022.01) | |
| H04L 67/5651 | (2022.01) | |
| H04L 67/75 | (2022.01) | |
| H04W 12/08 | (2021.01) | |

(52) U.S. Cl.
CPC ............ *G06F 3/167* (2013.01); *G06F 7/14* (2013.01); *G06F 16/176* (2019.01); *G06F 16/2255* (2019.01); *G06F 16/2365* (2019.01); *G06F 16/243* (2019.01); *G06F 16/24552* (2019.01); *G06F 16/24575* (2019.01); *G06F 16/24578* (2019.01); *G06F 16/248* (2019.01); *G06F 16/285* (2019.01); *G06F 16/3323* (2019.01); *G06F 16/3329* (2019.01); *G06F 16/3344* (2019.01); *G06F 16/338* (2019.01); *G06F 16/4393* (2019.01); *G06F 16/90332* (2019.01); *G06F 16/90335* (2019.01); *G06F 16/9038* (2019.01); *G06F 16/904* (2019.01); *G06F 16/951* (2019.01); *G06F 16/9535* (2019.01); *G06F 18/2411* (2023.01); *G06F 40/205* (2020.01); *G06F 40/295* (2020.01); *G06F 40/30* (2020.01); *G06F 40/40* (2020.01); *G06N 3/006* (2013.01); *G06N 3/08* (2013.01); *G06N 20/00* (2019.01); *G06Q 50/01* (2013.01); *G06V 20/10* (2022.01); *G06V 40/172* (2022.01); *G06V 40/28* (2022.01); *G10L 15/02* (2013.01); *G10L 15/063* (2013.01); *G10L 15/07* (2013.01); *G10L 15/16* (2013.01); *G10L 15/1815* (2013.01); *G10L 15/1822* (2013.01); *G10L 15/183* (2013.01); *G10L 15/187* (2013.01); *G10L 15/22* (2013.01); *G10L 15/26* (2013.01); *G10L 17/06* (2013.01); *G10L 17/22* (2013.01); *H04L 12/2816* (2013.01); *H04L 41/20* (2013.01); *H04L 41/22* (2013.01); *H04L 43/0882* (2013.01); *H04L 43/0894* (2013.01); *H04L 51/02* (2013.01); *H04L 51/216* (2022.05); *H04L 51/52* (2022.05); *H04L 67/306* (2013.01); *H04L 67/535* (2022.05); *H04L 67/5651* (2022.05); *H04L 67/75* (2022.05); *H04W 12/08* (2013.01); *G06F 2216/13* (2013.01); *G10L 13/00* (2013.01); *G10L 13/04* (2013.01); *G10L 2015/223* (2013.01); *G10L 2015/225* (2013.01); *H04L 51/046* (2013.01); *H04L 67/10* (2013.01); *H04L 67/53* (2022.05)

(58) Field of Classification Search
CPC ............ G06F 16/904; G06F 16/2255; G06F 16/24522; G06F 16/3323; G06F 16/90332; G06F 16/176; G06F 16/24575; G06F 16/3344; G06F 16/338; G06F 16/9535; G06F 16/2365; G06F 16/24578; G06F 16/951; G06F 40/40; G06F 40/205; G06F 40/295; G06F 40/30; G06F 18/2411; G06F 3/011; G06F 3/013; G06F 3/017; G06F 3/167; G06F 2216/13; G06N 20/00; G06N 3/006; G06N 3/08; G06V 40/172; G06V 40/28; G06V 20/10; H04L 67/5651; H04L 51/216; H04L 51/52; H04L 67/535; H04L 67/75; H04L 12/2816; H04L 41/20; H04L 41/22; H04L 43/0882; H04L 43/0894; H04L 67/306; H04L 67/53; H04L 51/046; H04L 67/10; G06Q 50/01; G10L 15/02; G10L 15/063; G10L 15/07; G10L 15/16; G10L 15/1815; G10L 15/1822; G10L 15/183; G10L 15/187; G10L 15/22; G10L 15/26; G10L 17/06; G10L 17/22; G10L 13/00; G10L 13/04; G10L 2015/223; G10L 2015/225; H04W 12/08

See application file for complete search history.

(56) References Cited

U.S. PATENT DOCUMENTS

| | | | |
|---|---|---|---|
| 6,115,458 | A | 9/2000 | Taskett |
| 6,484,136 | B1 | 11/2002 | Kanevsky et al. |
| 7,406,408 | B1 | 7/2008 | Lackey et al. |
| 7,426,537 | B2 | 9/2008 | Lee et al. |
| 8,019,748 | B1 | 9/2011 | Wu et al. |
| 8,370,162 | B2 | 2/2013 | Faisman et al. |
| 8,396,282 | B1 | 3/2013 | Huber et al. |
| 8,478,581 | B2 | 7/2013 | Chen |
| 8,949,250 | B1 | 2/2015 | Garg et al. |
| 9,026,145 | B1 | 5/2015 | Duleba et al. |
| 9,098,575 | B2 | 8/2015 | Ilyas et al. |
| 9,354,709 | B1 | 5/2016 | Heller et al. |
| 9,406,103 | B1 | 8/2016 | Gray et al. |
| 9,536,522 | B1 | 1/2017 | Hall et al. |
| 9,767,309 | B1 | 9/2017 | Patel et al. |
| 10,088,908 | B1 | 10/2018 | Poupyrev et al. |
| 10,108,707 | B1 | 10/2018 | Chu et al. |
| 10,127,227 | B1 * | 11/2018 | Badr .................. G06F 16/3329 |
| 10,134,388 | B1 | 11/2018 | Lilly |
| 10,336,856 | B2 | 7/2019 | Stache et al. |
| 10,354,307 | B2 | 7/2019 | Ye et al. |
| 10,412,026 | B2 | 9/2019 | Sherrets et al. |
| 10,839,098 | B2 | 11/2020 | Borup et al. |
| 10,867,256 | B2 | 12/2020 | Bugay et al. |
| 10,957,329 | B1 | 3/2021 | Liu et al. |
| 10,963,273 | B2 | 3/2021 | Peng et al. |
| 10,977,711 | B1 | 4/2021 | Verma et al. |
| 11,068,659 | B2 | 7/2021 | Cutting et al. |
| 11,087,756 | B1 | 8/2021 | Presant et al. |
| 11,120,158 | B2 | 9/2021 | Hockey et al. |
| 11,245,646 | B1 | 2/2022 | Koukoumidis |
| 11,308,169 | B1 | 4/2022 | Koukoumidis et al. |
| 11,334,165 | B1 | 5/2022 | Clements |
| 11,436,300 | B1 | 9/2022 | Felt et al. |
| 11,443,358 | B2 | 9/2022 | Chow |
| 11,727,677 | B2 | 8/2023 | Liu et al. |
| 2004/0019489 | A1 | 1/2004 | Funk et al. |
| 2004/0044516 | A1 | 3/2004 | Kennewick et al. |
| 2005/0010393 | A1 | 1/2005 | Danieli et al. |
| 2006/0047617 | A1 | 3/2006 | Bacioiu et al. |
| 2007/0073678 | A1 | 3/2007 | Scott et al. |
| 2007/0073745 | A1 | 3/2007 | Scott et al. |
| 2007/0239432 | A1 | 10/2007 | Soong et al. |
| 2008/0189269 | A1 | 8/2008 | Olsen |
| 2008/0243885 | A1 | 10/2008 | Harger et al. |
| 2009/0150153 | A1 | 6/2009 | Li et al. |
| 2009/0178011 | A1 | 7/2009 | Ording et al. |
| 2009/0300525 | A1 | 12/2009 | Jolliff et al. |
| 2010/0031143 | A1 | 2/2010 | Rao et al. |
| 2010/0241639 | A1 | 9/2010 | Kifer et al. |
| 2010/0306249 | A1 | 12/2010 | Hill et al. |
| 2011/0010675 | A1 | 1/2011 | Hamilton, II et al. |
| 2011/0093264 | A1 | 4/2011 | Gopalakrishnan |
| 2011/0093820 | A1 | 4/2011 | Zhang et al. |
| 2011/0169726 | A1 | 7/2011 | Holmdahl et al. |
| 2011/0184718 | A1 | 7/2011 | Chen |
| 2011/0238754 | A1 | 9/2011 | Dasilva et al. |
| 2012/0016678 | A1 | 1/2012 | Gruber et al. |
| 2012/0019446 | A1 | 1/2012 | Wu et al. |
| 2012/0041907 | A1 | 2/2012 | Wang et al. |
| 2012/0105257 | A1 | 5/2012 | Murillo et al. |
| 2012/0117051 | A1 | 5/2012 | Liu et al. |
| 2012/0159635 | A1 | 6/2012 | He et al. |
| 2012/0179453 | A1 | 7/2012 | Ghani et al. |
| 2012/0179633 | A1 | 7/2012 | Ghani et al. |
| 2012/0233188 | A1 | 9/2012 | Majumdar |
| 2012/0265787 | A1 | 10/2012 | Hsu et al. |
| 2012/0290526 | A1 | 11/2012 | Gupta et al. |
| 2012/0311035 | A1 | 12/2012 | Guha et al. |
| 2013/0096910 | A1 | 4/2013 | Stan et al. |
| 2013/0124538 | A1 | 5/2013 | Lee et al. |
| 2013/0191416 | A1 | 7/2013 | Lee et al. |
| 2013/0191790 | A1 | 7/2013 | Kawalkar |
| 2013/0204894 | A1 | 8/2013 | Faith et al. |
| 2013/0234945 | A1 | 9/2013 | Goktekin |
| 2013/0262752 | A1 | 10/2013 | Talagala et al. |
| 2013/0268624 | A1 | 10/2013 | Yagiura |
| 2013/0275441 | A1 | 10/2013 | Agrawal et al. |
| 2013/0282811 | A1 | 10/2013 | Lessin et al. |
| 2013/0296057 | A1 | 11/2013 | Gagner et al. |
| 2013/0317858 | A1 | 11/2013 | Hasan et al. |
| 2013/0346877 | A1 | 12/2013 | Borovoy et al. |
| 2014/0019459 | A1 | 1/2014 | Gradin et al. |
| 2014/0025702 | A1 | 1/2014 | Curtiss et al. |
| 2014/0040748 | A1 | 2/2014 | Lemay et al. |
| 2014/0094307 | A1 | 4/2014 | Doolittle et al. |
| 2014/0108562 | A1 | 4/2014 | Panzer |
| 2014/0115410 | A1 | 4/2014 | Kealy et al. |
| 2014/0122622 | A1 | 5/2014 | Castera et al. |
| 2014/0214410 | A1 | 7/2014 | Jang et al. |
| 2014/0222415 | A1 | 8/2014 | Legat |
| 2014/0222422 | A1 | 8/2014 | Sarikaya et al. |
| 2014/0225931 | A1 | 8/2014 | Plagemann et al. |
| 2014/0278786 | A1 | 9/2014 | Liu-Qiu-Yan |
| 2014/0282153 | A1 | 9/2014 | Christiansen et al. |
| 2014/0310788 | A1 | 10/2014 | Ricci |
| 2014/0314283 | A1 | 10/2014 | Harding |
| 2014/0330832 | A1 | 11/2014 | Mau |
| 2014/0354539 | A1 | 12/2014 | Skogö et al. |
| 2014/0358843 | A1 | 12/2014 | Subramaniam et al. |
| 2015/0012345 | A1 | 1/2015 | Bhagat et al. |
| 2015/0019227 | A1 | 1/2015 | Anandarajah |
| 2015/0046841 | A1 | 2/2015 | Sharon et al. |
| 2015/0067502 | A1 | 3/2015 | Yang et al. |
| 2015/0088593 | A1 | 3/2015 | Raghunathan et al. |
| 2015/0185827 | A1 | 7/2015 | Sayed |
| 2015/0199333 | A1 | 7/2015 | Nekhay |
| 2015/0279389 | A1 | 10/2015 | Lebeau et al. |
| 2015/0293597 | A1 | 10/2015 | Mishra et al. |
| 2015/0293995 | A1 | 10/2015 | Chen et al. |
| 2015/0317302 | A1 | 11/2015 | Liu et al. |
| 2015/0332670 | A1 | 11/2015 | Akbacak et al. |
| 2015/0347572 | A1 | 12/2015 | Yang et al. |
| 2015/0348551 | A1 | 12/2015 | Gruber et al. |
| 2015/0370798 | A1 | 12/2015 | Ju et al. |
| 2016/0021179 | A1 | 1/2016 | James et al. |
| 2016/0026720 | A1 | 1/2016 | Lehrer et al. |
| 2016/0042069 | A1 | 2/2016 | Lee-Goldman et al. |
| 2016/0063553 | A1 | 3/2016 | Pesochinsky |
| 2016/0070449 | A1 | 3/2016 | Christiansen et al. |
| 2016/0080485 | A1 | 3/2016 | Hamedi |
| 2016/0092160 | A1 * | 3/2016 | Graff ........................ G06F 3/167 704/257 |
| 2016/0093304 | A1 | 3/2016 | Kim et al. |
| 2016/0156574 | A1 | 6/2016 | Hum et al. |
| 2016/0156584 | A1 | 6/2016 | Hum et al. |
| 2016/0173578 | A1 | 6/2016 | Sharma et al. |
| 2016/0239751 | A1 | 8/2016 | Mosterman et al. |
| 2016/0259717 | A1 | 9/2016 | Nychis et al. |
| 2016/0283016 | A1 | 9/2016 | Zaitsev et al. |
| 2016/0371054 | A1 | 12/2016 | Beaumont et al. |
| 2017/0005803 | A1 | 1/2017 | Brownewell et al. |
| 2017/0063887 | A1 | 3/2017 | Muddu et al. |
| 2017/0092008 | A1 | 3/2017 | Djorgovski et al. |
| 2017/0098236 | A1 | 4/2017 | Lee et al. |
| 2017/0161018 | A1 | 6/2017 | Lemay et al. |
| 2017/0220426 | A1 | 8/2017 | Sankar et al. |
| 2017/0228240 | A1 | 8/2017 | Khan et al. |
| 2017/0228366 | A1 | 8/2017 | Bui et al. |
| 2017/0235848 | A1 | 8/2017 | Van Dusen et al. |
| 2017/0242847 | A1 | 8/2017 | Li et al. |
| 2017/0243107 | A1 | 8/2017 | Jolley et al. |
| 2017/0255272 | A1 | 9/2017 | Flagg et al. |
| 2017/0255580 | A1 | 9/2017 | Parekh et al. |
| 2017/0290077 | A1 | 10/2017 | Nilsson et al. |
| 2017/0300831 | A1 | 10/2017 | Gelfenbeyn et al. |
| 2017/0316159 | A1 | 11/2017 | Hooker |

(56) References Cited

U.S. PATENT DOCUMENTS

| | | |
|---|---|---|
| 2017/0351969 A1 | 12/2017 | Parmar et al. |
| 2017/0364563 A1 | 12/2017 | Gao et al. |
| 2017/0373999 A1 | 12/2017 | Abou Mahmoud et al. |
| 2018/0020285 A1* | 1/2018 | Zass .................... G10L 21/0224 |
| 2018/0052842 A1 | 2/2018 | Hewavitharana et al. |
| 2018/0060029 A1 | 3/2018 | Kogan et al. |
| 2018/0060439 A1 | 3/2018 | Kula et al. |
| 2018/0068019 A1 | 3/2018 | Novikoff et al. |
| 2018/0068661 A1 | 3/2018 | Printz |
| 2018/0075844 A1 | 3/2018 | Kim et al. |
| 2018/0075847 A1 | 3/2018 | Lee et al. |
| 2018/0082191 A1 | 3/2018 | Pearmain et al. |
| 2018/0089164 A1* | 3/2018 | Iida ........................ G06N 5/022 |
| 2018/0101893 A1 | 4/2018 | Dagan et al. |
| 2018/0130194 A1 | 5/2018 | Kochura et al. |
| 2018/0150233 A1 | 5/2018 | Hanzawa et al. |
| 2018/0150280 A1 | 5/2018 | Rhee et al. |
| 2018/0176614 A1 | 6/2018 | Lin et al. |
| 2018/0232662 A1 | 8/2018 | Solomon et al. |
| 2018/0233139 A1 | 8/2018 | Finkelstein et al. |
| 2018/0233141 A1 | 8/2018 | Solomon et al. |
| 2018/0246983 A1 | 8/2018 | Rathod |
| 2018/0260086 A1 | 9/2018 | Leme et al. |
| 2018/0260481 A1 | 9/2018 | Rathod |
| 2018/0260680 A1 | 9/2018 | Finkelstein et al. |
| 2018/0300040 A1 | 10/2018 | Mate et al. |
| 2018/0309779 A1 | 10/2018 | Benyo et al. |
| 2018/0329982 A1 | 11/2018 | Patel et al. |
| 2018/0330280 A1 | 11/2018 | Erenrich et al. |
| 2018/0330721 A1 | 11/2018 | Thomson et al. |
| 2018/0332118 A1 | 11/2018 | Phipps et al. |
| 2019/0005549 A1 | 1/2019 | Goldshtein et al. |
| 2019/0007208 A1 | 1/2019 | Surla et al. |
| 2019/0034849 A1 | 1/2019 | Romaine et al. |
| 2019/0035390 A1* | 1/2019 | Howard .................. G10L 15/16 |
| 2019/0051289 A1 | 2/2019 | Yoneda et al. |
| 2019/0082221 A1* | 3/2019 | Jain .................... H04N 21/4825 |
| 2019/0095785 A1 | 3/2019 | Sarkar et al. |
| 2019/0115008 A1* | 4/2019 | Jiang ...................... G10L 15/22 |
| 2019/0132265 A1* | 5/2019 | Nowak-Przygodzki ..................... G10L 15/1815 |
| 2019/0147849 A1* | 5/2019 | Talwar ................ G10L 15/1807 704/258 |
| 2019/0171655 A1 | 6/2019 | Psota et al. |
| 2019/0206401 A1 | 7/2019 | Liu et al. |
| 2019/0236167 A1 | 8/2019 | Hu et al. |
| 2019/0287526 A1 | 9/2019 | Ren et al. |
| 2019/0311301 A1 | 10/2019 | Pyati |
| 2019/0318735 A1 | 10/2019 | Chao et al. |
| 2019/0325864 A1* | 10/2019 | Anders .................... G06F 3/167 |
| 2019/0341021 A1* | 11/2019 | Shang ................ G06F 16/3329 |
| 2020/0012681 A1 | 1/2020 | McInerney et al. |
| 2020/0035220 A1* | 1/2020 | Liu ..................... G06F 16/3329 |
| 2020/0202171 A1 | 6/2020 | Hughes et al. |
| 2021/0011967 A1 | 1/2021 | Rathod |
| 2021/0110115 A1 | 4/2021 | Hermann et al. |
| 2021/0281632 A1 | 9/2021 | Brewer et al. |
| 2021/0303512 A1 | 9/2021 | Barday et al. |
| 2022/0006661 A1 | 1/2022 | Rathod |
| 2022/0038615 A1 | 2/2022 | Chaudhri et al. |
| 2022/0092131 A1 | 3/2022 | Koukoumidis et al. |
| 2022/0188361 A1 | 6/2022 | Botros et al. |
| 2022/0254338 A1 | 8/2022 | Gruber et al. |
| 2022/0382376 A1 | 12/2022 | Wang et al. |

FOREIGN PATENT DOCUMENTS

| | | |
|---|---|---|
| CN | 101465749 A | 6/2009 |
| CN | 101772792 A | 7/2010 |
| CN | 103262156 A | 8/2013 |
| CN | 103294195 A | 9/2013 |
| CN | 103608837 A | 2/2014 |
| CN | 103703466 A | 4/2014 |
| CN | 104718765 A | 6/2015 |
| CN | 104981681 A | 10/2015 |
| CN | 105830150 A | 8/2016 |
| CN | 105843801 A | 8/2016 |
| CN | 105917330 A | 8/2016 |
| CN | 106055114 A | 10/2016 |
| CN | 106462909 A | 2/2017 |
| CN | 106527709 A | 3/2017 |
| CN | 106997236 A | 8/2017 |
| CN | 107003723 A | 8/2017 |
| CN | 107148554 A | 9/2017 |
| CN | 107210033 A | 9/2017 |
| CN | 107408324 A | 11/2017 |
| CN | 107490971 A | 12/2017 |
| CN | 107633042 A | 1/2018 |
| CN | 107704559 A | 2/2018 |
| CN | 107750360 A | 3/2018 |
| CN | 107924552 A | 4/2018 |
| JP | H1173297 A | 3/1999 |
| JP | 2015095232 A | 5/2015 |
| JP | 2015191561 A | 11/2015 |
| JP | 2016151736 A * | 8/2016 |
| KR | 20170140079 A | 12/2017 |
| WO | 2018053502 A1 | 3/2018 |
| WO | 2018235191 A1 | 12/2018 |

OTHER PUBLICATIONS

Wen et al., Personalized Language Modeling by Crowd Sourcing with Social Network Data for Voice Access of Cloud Applications, 2012, IEEE, whole document (Year: 2012).*

Li et al., A Persona-Based Neural Conversation Model, 2016, arXiv, whole document (Year: 2016).*

Mahajan D., et al., "LogUCB: An Explore-Exploit Algorithm for Comments Recommendation," Proceedings of the 21st ACM International Conference on Information and Knowledge Management (CIKM '12), 2012, pp. 6-15.

Moon T., et al., "Online Learning for Recency Search Ranking Using Real-Time User Feedback," Proceedings of the 19th ACM International Conference on Information and Knowledge Management (CIKM '10), 2010, pp. 1501-1504.

Vanchinathan H.P., et al., "Explore-Exploit in Top-N Recommender Systems via Gaussian Processes," Proceedings of the 8th ACM Conference on Recommender systems (RecSys '14), 2014, pp. 225-232.

Anonymous, "Semantic Parsing," Wikipedia, Mar. 22, 2018, 5 pages, Retrieved from the Internet: URL: https://en.wikipedia.org/w/index.php?title=Semantic_parsing&oldid=831890029, [Retrieved on May 24, 2022].

Anonymous, "Semantic Role Labeling," Wikipedia, Jan. 27, 2018, 2 pages, Retrieved from the Internet: URL: https://en.wikipedia.org/w/index.php?title=Semantic_role_labeling&oldid=822626564, [Retrieved on May 24, 2022].

Armentano M.G., et al., "A Framework for Attaching Personal Assistants to Existing Applications," Computer Languages, Systems & Structures, 2009, vol. 35(4), pp. 448-463.

Patel A., et al., "Cross-Lingual Phoneme Mapping for Language Robust Contextual Speech Recognition," IEEE International Conference on Acoustics, Speech and Signal Processing (ICASSP), 2018, pp. 5924-5928.

Trottier D., "A Research Agenda for Social Media Surveillance," Fast Capitalism, 2011, vol. 8, Issue 1, pp. 59-68.

Wong Y.W., et al., "Scalable Attribute-Value Extraction from Semi-Structured Text," IEEE International Conference on Data Mining Workshops, 2009, pp. 302-307.

Kar R., et al., "Applying Chatbots to the Internet of Things: Opportunities and Architectural Elements," arXiv: 1611.03799v1, submitted on Nov. 11, 2016, (2017), 9 pages.

Germanakos P., et al., "Realizing Comprehensive User Profile as the Core Element of Adaptive and Personalized Communication Environments and Systems," The Computer Journal, Oct. 31, 2009, vol. 52, No. 7, pp. 749-770.

Office Action mailed Jan. 15, 2024 for Chinese Application No. 201880094857.0, filed Jun. 20, 2018, 18 pages.

(56) References Cited

OTHER PUBLICATIONS

Office Action mailed Dec. 21, 2023 for Chinese Application No. 201880094771.8, filed Jun. 25, 2018, 23 pages.
Office Action mailed Dec. 26, 2023 for Chinese Application No. 201880094305.X, filed May 25, 2018, 7 pages.
Office Action mailed Dec. 29, 2023 for Chinese Application No. 201880094828.4, filed Aug. 3, 2018, 28 pages.
Office Action mailed Jan. 17, 2024 for Chinese Application No. 201880094827.X, filed Jul. 19, 2018, 6 pages.
Takahashi Y., et al., "User and Device Adaptation for Sports Video Content," 2007 IEEE International Conference on Multimedia and Expo, Jul. 5, 2007, pp. 1051-1054.
Batrinca B., et al., "Social media analytics: a survey of techniques, tools and platforms,", AI Society [Online], Feb. 2015, vol. 30 (1), pp. 89-116, [Retrieved on Mar. 28, 2019], Retrieved from the Internet: URL: https://link. springer.com/article/10.1007/s00146-014-0549-4.
Klopfenstein L.C., et al., "The Rise of Bots: A survey of Conversational Interfaces, Patterns, and Paradigms," DIS 2017 Proceedings of the 2017 Conference on Designing Interactive Systems, Jun. 10, 2017, pp. 555-565.
Office Action for Chinese Application No. 201880094832.0, filed Oct. 4, 2018, mailed Mar. 4, 2024, 17 pages.
CNIPA—Office Action mailed May 15, 2024 for Chinese Application No. 201880094771.8, filed Jun. 25, 2018, 7 pages.
Sarikaya R., "The Technology Behind Personal Digital Assistants: An Overview of the System Architecture and Key Components," IEEE Signal Processing Magazine, Jan. 1, 2017, vol. 34 (1), pp. 67-81, XP011639190.
Liu S., "User Intention oriented Social Image Retrieval," Apr. 2016, 102 pages. [Cover page and Abstract only in English translation].
Office Action mailed Jul. 25, 2024 for Chinese Application No. 201980040312.6, filed Apr. 19, 2019, 9 pages.

\* cited by examiner

ASSISTING USERS WITH PERSONALIZED AND CONTEXTUAL COMMUNICATION CONTENT

PRIORITY

This application is a continuation under 35 U.S.C. § 120 of U.S. patent application Ser. No. 16/996,196, filed 18 Aug. 2020, which is a continuation under 35 U.S.C. § 120 of U.S. patent application Ser. No. 15/966,455, filed 30 Apr. 2018, which claims the benefit under 35 U.S.C. § 119(e) of U.S. Provisional Patent Application No. 62/660,876, filed 20 Apr. 2018, each of which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may automatically identify a user's intent and language register based on a user input, generate a communication content suitable for such intent and language register for the user, detect a change of the user's intent and language register, and dynamically adjust the generation of the communication content to fit the changed intent and language register. In linguistics, a language register characterizes a particular intent coupled with a particular scenario, which is a linguistic term of art for a variation of a language used for a particular purpose or in a particular social setting. For example, a language register may reflect word choices, voice tunes (in speech), speed, etc. In particular embodiments, the assistant system may first learn a plurality of language-register models corresponding to a plurality of language registers associated with a user. When receiving the user input as part of an interaction with another user or the assistant system, the assistant system may identify the user's language register based on the user input and select a suitable language-register model accordingly. In addition, the assistant system may detect the change of the user's language register and respond to such change by selecting a different language-register model that better fits the changed language register. The assistant system may further use the selected language-register model in combination with a language template corresponding to the user's intent to generate the communication content. In particular embodiments, the generated communication content may serve as a suggestion to the user for usage if the user is interacting with another user. The generated language communication may also serve as a response to the user if the user is interacting with the assistant system. By using particular language-register models for particular language registers of a user, the generated communication contents are more natural and personalized. Although this disclosure describes generating particular communication content via a particular system in a particular manner, this disclosure contemplates generating any suitable communication content via any suitable system in any suitable manner.

In particular embodiments, the assistant system may receive a first user input by the first user from a client system associated with a first user. The first user input may be associated with a current dialog session. In particular embodiments, the assistant system may identify a first language register associated with the first user based on the first user input. In particular embodiments, the assistant system may then access a plurality of language-register models associated with a plurality of language registers stored in a data store. The assistant system may select a first language-register model from the plurality of language-register models based on the identified first language register. In particular embodiments, the assistant system may further generate a first communication content responsive to the first user input. The first communication content may be personalized for the first user based on the selected first language-register model.

Certain technical challenges exist for achieving the goal of generating a particular communication content suitable for a particular intent and a particular language register. One technical challenge includes generating a particular communication content for a particular language register. The solution presented by the embodiments disclosed herein to address the above challenge is training various language-register models corresponding to various language registers based on a plurality of groups of training samples. Each group of training samples correspond to a particular language register. Another technical challenge includes generating a personalized and natural communication content for a user. The solution presented by the embodiments disclosed herein to address this challenge is training the language-register models based on training data associated with the user including news feed posts, news feed comments, user profile, messages, etc., associated with that user, allowing the language-register models to be personalized for the user.

Certain embodiments disclosed herein may provide one or more technical advantages. A technical advantage of the embodiments may include dynamically generating communication contents in different manners in response to different scenarios associated with users. For example, the assistant system may generate a formal and professional communication content for a user who talks about a serious subject matter (e.g., a pending lawsuit). Another technical advantage of the embodiments may include increasing the degree of users engaging with the assistant system by providing users with more personalized and natural communication contents. For example, long sentences with complicated or formal words may be unappealing to teenage users and they may not be willing to use the assistant service in the future if the communication contents are based on such formality. By contrast, the assistant system may generate communication contents based on simple words/slang and short sentences for teenage users to attract them to be more engaged with the assistant system. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
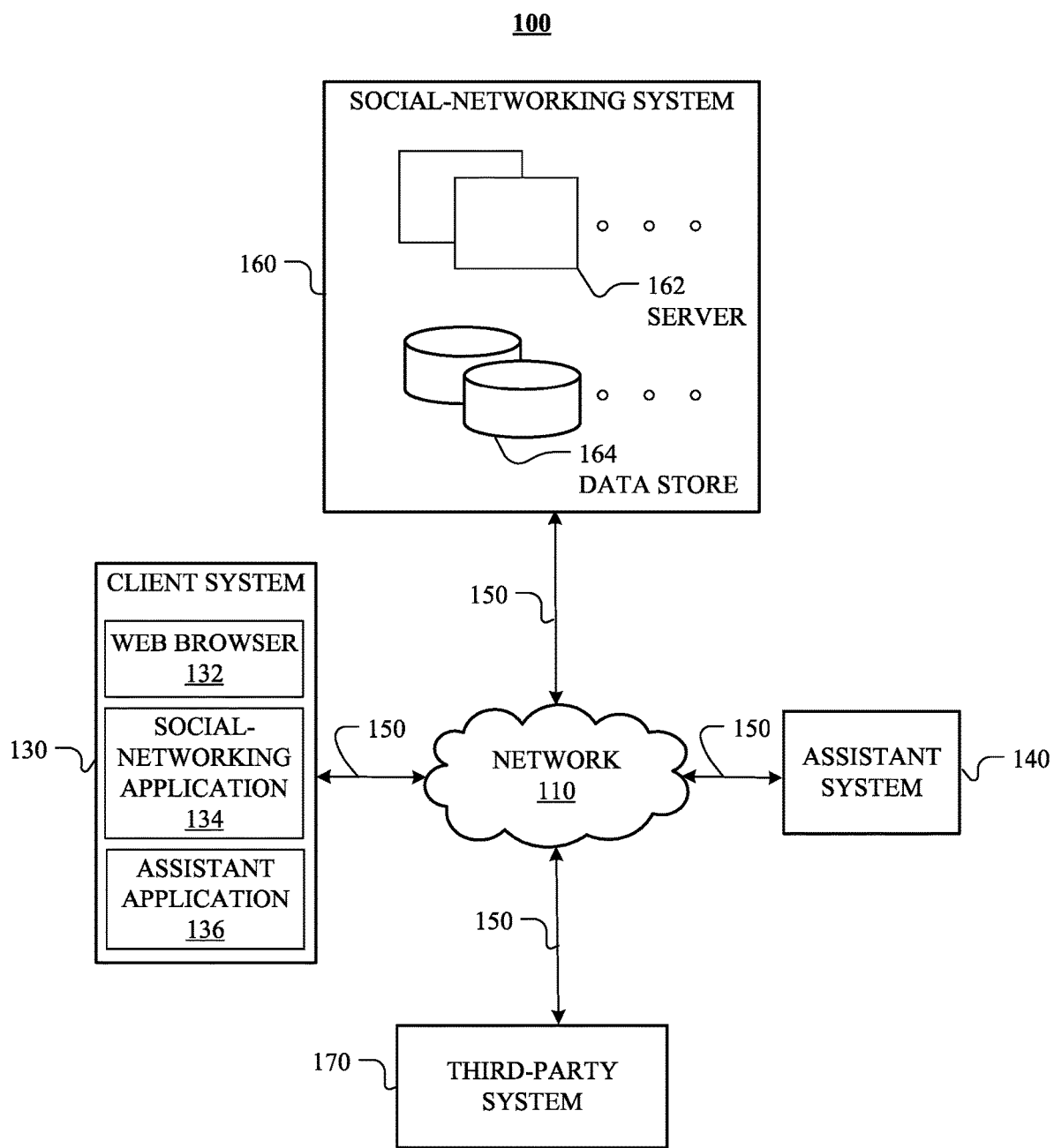
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, a client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. patent application Ser. No. 29/631,910, filed 3 Jan. 2018, U.S. patent application Ser. No. 29/631,747, filed 2 Jan. 2018, U.S. patent application Ser. No. 29/631,913, filed 3 Jan. 2018, and U.S. patent application Ser. No. 29/631,914, filed 3 Jan. 2018, which are incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
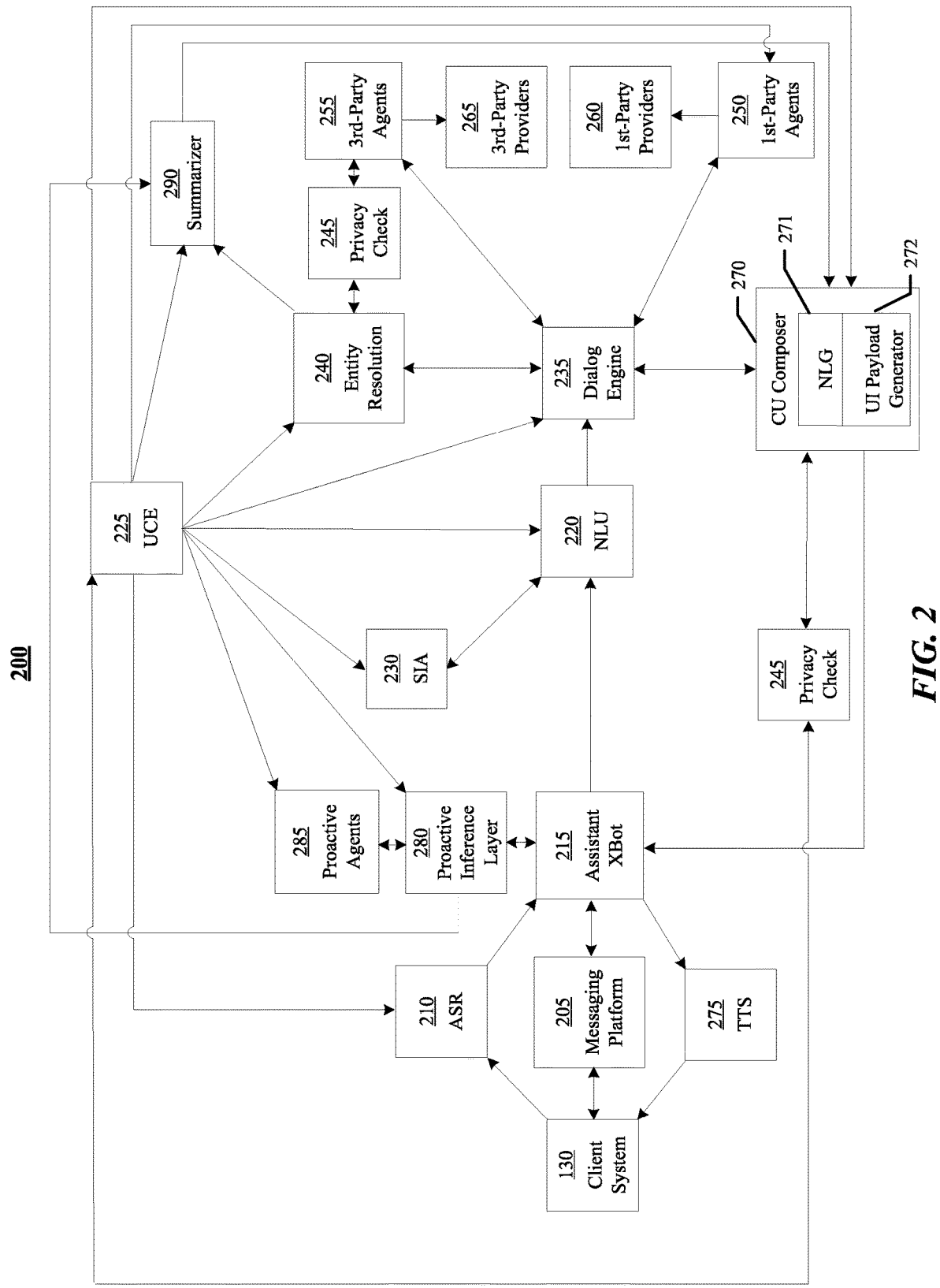
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings whenever it is necessary to guarantee that accessing user profile and executing different tasks are subject to the user's privacy settings.

In particular embodiments, the assistant system 140 may receive a user input from the assistant application 136 in the client system 130 associated with the user. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of user profile may be protected behind a privacy check module 245 to ensure that a user's information can be used only for his/her benefit, and not shared with anyone else. The semantic information aggregator 230 may provide ontology data associated with a plurality of predefined domains, intents, and slots to the NLU module 220. In particular embodiments, a domain may denote a social context of interaction, e.g., education. An intent may indicate a purpose of a user interacting with the assistant system 140. A slot may represent a basic semantic entity. For example, a slot for "pizza" may be dish. The semantic information aggregator 230 may additionally extract information from a social graph, a knowledge graph, and a concept graph, and retrieve user profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. Based on the output of the user context engine 225 and the semantic information aggregator 230, the NLU module 220 may identify a domain, an intent, and one or more slots from the user input in a personalized and context-aware manner. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources, and then deduped, resolved, and fused to generate the single unique record for the knowledge graph. The entity may be associated with a space attribute value which indicates the genre of the movie "The Martian" (2015). The entity resolution module 240 may additionally request user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score.

In particular embodiments, the dialog engine 235 may communicate with different agents based on the identified intent and domain, and the resolved entities. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on user profile. The generation may be based on a straightforward backend query using deterministic filters to retrieve the candidate entities from a structured data store. The generation may be alternatively based on a machine-learning model that is trained based on user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on user profile and the content associated with the candidate entities. The ranking may be based on the similarities between a user's interests and the candidate entities.

As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275.

Figure 3:
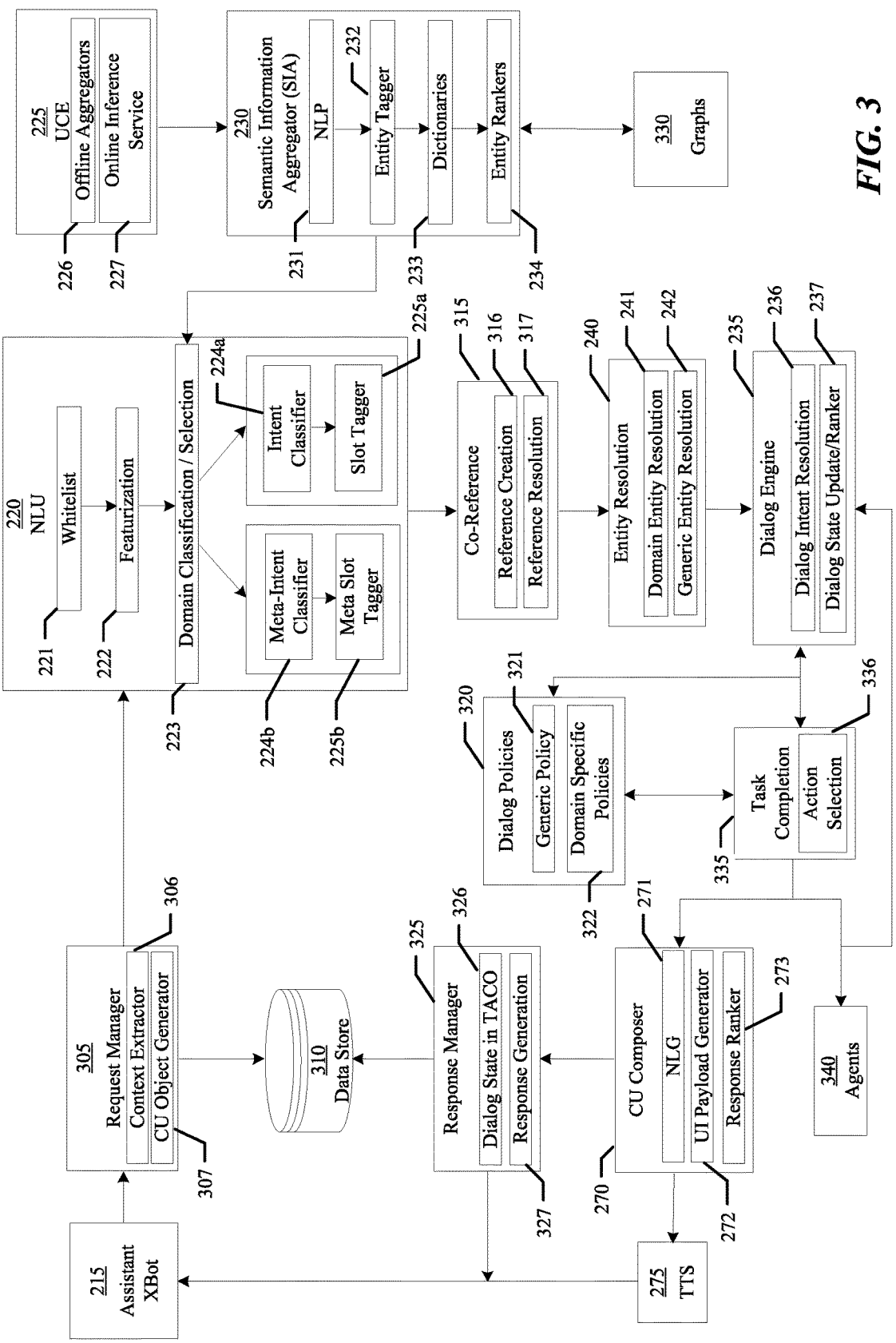
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The CU object generator 307 may generate particular content objects relevant to the user request. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. At step 222, the NLU module 220 may perform a featurization based on the whitelist. At step 223, the NLU module 220 may perform domain classification/selection based on the features resulted from the featurization. The domain classification/selection results may be further processed based on two related procedures. At step 224a, the NLU module 220 may process the domain classification/selection result using an intent classifier. The intent classifier may determine the user's intent associated with the user request. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. At step 225b, the NLU module 220 may use a meta slot tagger to annotate one or more slots for the classification result from the meta-intent classifier. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, the semantic information aggregator 230 may then process the retrieved information, i.e., user profile, from the user context engine 225 in the following steps. At step 231, the semantic information aggregator 230 may process the retrieved information from the user context engine 225 based on natural-language processing (NLP). At step 232, the processing result may be annotated with entities by an entity tagger. Based on the annotations, the semantic information aggregator 230 may generate dictionaries for the retrieved information at step 233. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. The co-reference module 315 may comprise reference creation 316 and reference resolution 317. In particular embodiments, the reference creation 316 may create references for entities determined by the NLU module 220. The reference resolution 317 may resolve these references accurately. In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a car, the generic entity resolution 242 may resolve the car as vehicle and the domain entity resolution 241 may resolve the car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session. In particular embodiments, the dialog state update/ranker 237 may update/rank the state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. The task completion module 335 may comprise an action selection component 336. In particular embodiments, the dialog engine 235 may additionally check against dialog policies 320 regarding the dialog state. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Assisting Users with Personalized and Contextual Communication Content

In particular embodiments, an assistant system 140 may automatically identify a user's intent and language register based on a user input, generate a communication content suitable for such intent and language register for the user, detect a change of the user's intent and language register, and dynamically adjust the generation of the communication content to fit the changed intent and language register. In linguistics, a language register characterizes a particular intent coupled with a particular scenario, which is a linguistic term of art for a variation of a language used for a particular purpose or in a particular social setting. For example, a language register may reflect word choices, voice tunes (in speech), speed, etc. In particular embodiments, the assistant system 140 may first learn a plurality of language-register models corresponding to a plurality of language registers associated with a user. When receiving the user input as part of an interaction with another user or the assistant system 140, the assistant system 140 may identify the user's language register based on the user input and select a suitable language-register model accordingly. In addition, the assistant system 140 may detect the change of the user's language register and respond to such change by selecting a different language-register model that better fits the changed language register. The assistant system 140 may further use the selected language-register model in combination with a language template corresponding to the user's intent to generate the communication content. In particular embodiments, the generated communication content may serve as a suggestion to the user for usage if the user is interacting with another user. The generated language communication may also serve as a response to the user if the user is interacting with the assistant system 140. By using particular language-register models for particular language registers of a user, the generated communication contents are more natural and personalized. Although this disclosure describes generating particular communication content via a particular system in a particular manner, this disclosure contemplates generating any suitable communication content via any suitable system in any suitable manner.

Figure 4:
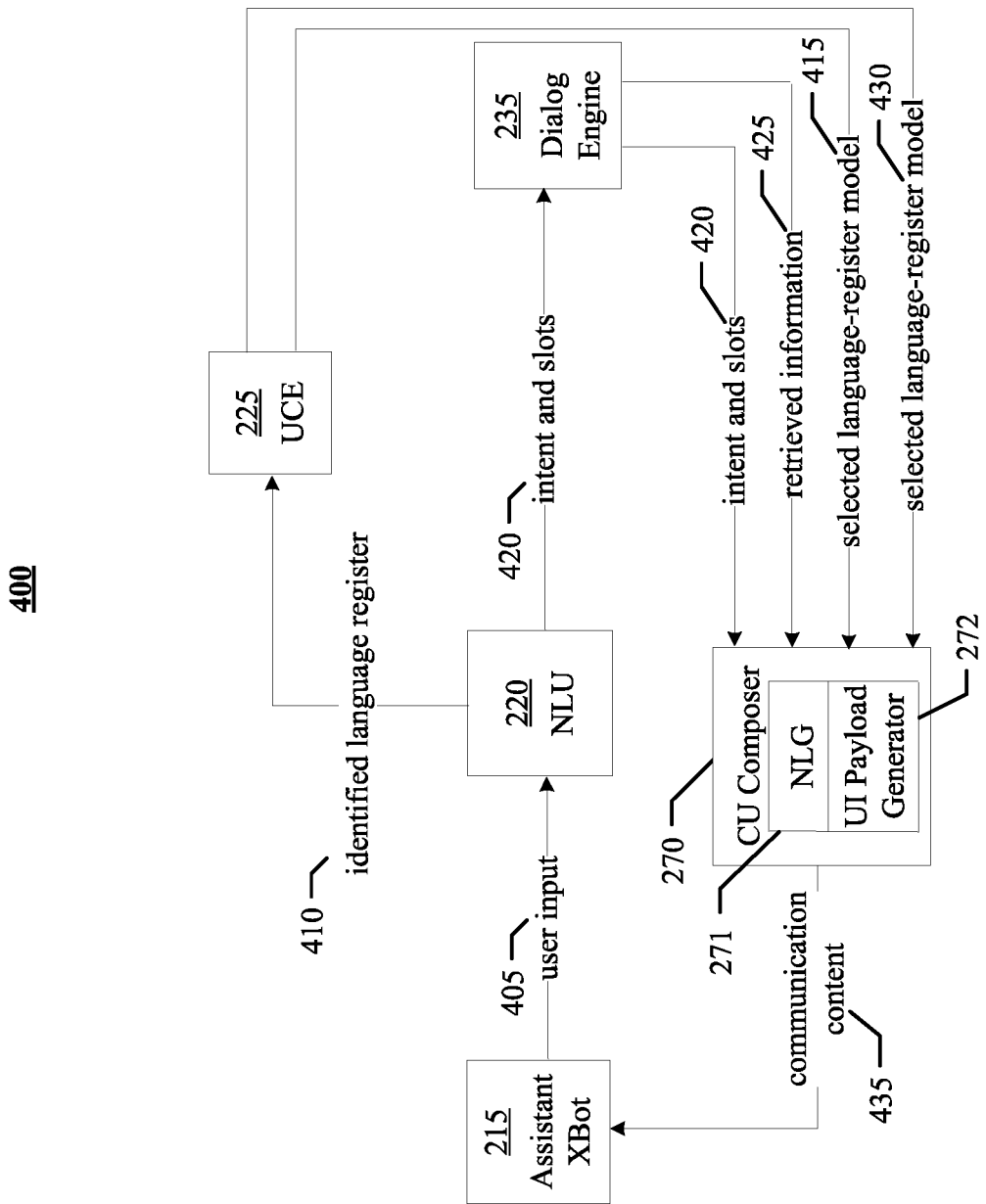
FIG. 4 illustrates an example diagram flow of generating a communication content based on the example architecture of the assistant system in FIG. 2.

FIG. 4 illustrates an example diagram flow of generating a communication content based on the example architecture 200 of the assistant system 140 in FIG. 2. In particular embodiments, the assistant xbot 215 may receive a first user input 405 by a first user from a client system 130 associated with the first user. The first user input 405 may be associated with a current dialog session. The assistant xbot 215 may send the first user input 405 to the NLU module 220. In particular embodiments, the NLU module 220 may identify a first language register associated with the first user based on the first user input 405. The NLU module 220 may identify the first language register based on a machine-learning model. In particular embodiments, the NLU module 220 may then access a plurality of language-register models associated with a plurality of language registers stored in a data store. As an example and not by way of limitation, the data store may comprise the user context engine 225. In particular embodiments, the NLU module 220 may use the machine-learning model to process the user input 405 to generate a feature vector, calculate probabilities of the user input 405 being associated with the plurality of language registers, and identify the first language register as the one with which the user input 405 has the highest similarity. In particular embodiments, the NLU module 220 may send the identified first language register to the user context engine 225 when accessing the plurality of language-register models. In particular embodiments, the user context engine 225 may select a first language-register model from the plurality of language-register models based on the identified first language register. The selected language-register model 415 may be sent to the CU composer 270. In particular embodiments, the NLU module 220 may further identify an intent and one or more slots associated with the first user input 405. As an example and not by way of limitation, the user input 405 may be "show me the showtime of spider man". The intent may be getting information of a movie. One slot may be <time> corresponding to "showtime" and another slot may be <name> corresponding to "spider man". In particular embodiments, the NLU module 220 may use a deep learning architecture comprising multiple long-short term memory (LSTM) networks to identify the intent and the one or more slots. As an example and not by way of limitation, the NLU module 220 may use a recurrent neural network grammar (RNNG) model, which is a type of recurrent and recursive LSTM algorithm, to identify the intent and slots. The NLU module 220 may send the identified intent and slots 420 to the dialog engine 235. In particular embodiments, the dialog engine 235 may determine an action based on the identified intent and execute the action to retrieve information associated with the one or more slots from one or more information sources. Continuing with the previous example, the action may be fetching movie information. In particular embodiments, the one or more information sources may comprise one or more of: one or more first-party agents 250; or one or more third-party agents 255. In particular embodiments, the dialog engine 235 may send the retrieved information 425 along with the intent and slots 420 to the CU composer 270. In particular embodiments, the CU composer 270 may access a plurality of language-generation templates stored in the data store (e.g., the user context engine 225). The plurality of language-generation templates may be generated manually by human or automatically by machine-learning algorithms. Each language-generation template may comprise one or more slots corresponding to the one or more slots associated with the first user input 405. The CU composer 270 may then select a language-generation template from the plurality of language-generation templates based on the action, which is determined from the identified intent. The CU composer 270 may further generate a first communication content 430 responsive to the first user input 405. The first communication content 430 may be personalized for the first user based on the selected first language-register model 415, the intent and slots 420, the retrieved information 425, and the selected language-generation template 430. In particular embodiments, the communication content 430 may be further sent from the CU composer 270 to the assistant xbot 215. Although this disclosure describes generating particular communication content based on a particular process flow in a particular manner, this disclosure contemplates generating any suitable communication content based on any suitable process flow in any suitable manner.

In particular embodiments, the assistant system 140 may generate the communication content for the first user based on the following process. The assistant system 140 may generate a list of candidate words based on the identified language register and the retrieved information. Each candidate word may be associated with a weight. As an example and not by way of limitation, the identified language register may comprise a formal language register and the list of candidate words may include "have not" instead of "haven't". The assistant system 140 may then prune the list of candidate words. As an example and not by way of limitation, the pruning may comprise removing junk words. The assistant system 140 may also rank the pruned list of candidate words based on their weights. The assistant system 140 may further insert, from the pruned list of candidate words, one of the candidate words into each slot of the selected language-generation template. Although this disclosure describes generating particular communication content based on particular candidate words in a particular manner, this disclosure contemplates generating any suitable communication content based on any suitable candidate words in any suitable manner.

In particular embodiments, the assistant system 140 may train the plurality of language-register models based on a word-embedding model. The assistant system 140 may train the plurality of language-register models offline and use them online. In particular embodiments, the word-embedding model may be based on convolutional neural networks. As an example and not by way of limitation, the word-embedding model may be word2vec, which is a group of related models that are used to produce word embeddings. As another example and not by way of limitation, the word-embedding model may be FastText, which is an extension to word2vec that breaks words into several n-grams instead of feeding individual words into the neural networks. FastText generates word embeddings for all the n-grams after training the neural networks. Although this disclosure describes the word-embedding model being based on convolutional neural networks, this disclosure contemplates the word-embedding model being based on any suitable model. In particular embodiments, the plurality of language-register models may be personalized with respect to the first user. The personalization may be achieved as follows. In particular embodiments, each language-register model may be trained based on a plurality of training samples associated with the first user. The training samples may comprise one or more of news feed posts, news feed comments, a user profile, or messages. The messages may include the first user's chatting messages with the assistant xbot 215 and the usage of such messages is subject to the first user's privacy settings. The messages may also include the first user's chatting messages with one or more second users and the usage of such messages is subject to both the first user's and second users' privacy settings. Training the language-register models based on aforementioned training data may be an effective solution for addressing the technical challenge of generating a personalized and natural communication content for a user. In addition, the embodiments disclosed herein may have a technical advantage of increasing the degree of users engaging with the assistant system 140. For example, long sentences with complicated or formal words may be unappealing to teenage users and they may not be willing to use the assistant service in the future if the communication contents are based on such formality. By contrast, the assistant system 140 may generate communication contents based on simple words/slang and short sentences for teenage users to attract them to be more engaged with the assistant system 140. In particular embodiments, the assistant system 140 may additionally use audio or video data associated with the first user to train the language-register model. The assistant system 140 may use one or more techniques such as audio speech recognition to extract textual data from the audio or video data. In particular embodiments, the assistant system 140 may further cluster the plurality of training samples into one or more groups of training samples based on one or more criteria. In particular embodiments, different groups of training samples may correspond to different language registers. As an example and not by way of limitation, the one or more criteria may comprise one or more of age, relationship, location, education, interest, native language, other suitable criteria, or any combination thereof. For example, a user's chatting messages with his/her friends may form a group of training samples whereas the user's chatting messages with his/her family members may form another group of training samples. In particular embodiments, the assistant system 140 may further train, for each group, a language-register model for the group based on the training samples associated with the group. Training various language-register models corresponding to various language registers based on a plurality of groups of training samples may be an effective solution for addressing the technical challenge of generating a particular communication content for a particular language register. Although this disclosure describes training particular language-register models in a particular manner, this disclosure contemplates training any suitable language-register models in any suitable manner.

In particular embodiments, the first user may be in the current dialog session with a second user. The current dialog session may comprise a message thread between the first user and the second user. In particular embodiments, the assistant system 140 may send, to the client system 130, instructions for presenting the generated first communication content to the first user. The generated first communication content may be operable to allow the first user to select the generated first communication content. In particular embodiments, the assistant system 140 may receive, from the client system 130, a selection of the generated first communication content from the first user. The assistant system 140 may then insert the generated first communication content in the message thread between the first user and the second user. In particular embodiments, the first user may be in the current dialog session with an assistant xbot 215. The current dialog session may comprise a message thread between the first user and the assistant xbot 215. In particular embodiments, the assistant system 140 may insert the generated first communication content in the message thread between the first user and the assistant xbot 215. Although this disclosure describes providing particular communication content to users in particular manners, this disclosure contemplates providing any suitable communication content to users in any suitable manner.

In particular embodiments, the assistant system 140 may have a technical advantage of detecting a change of the language register associated with the first user within the current dialog session and responding to such change by selecting a different language-register model that is more suitable. In particular embodiments, the assistant system 140 may receive, from the client system 130, a second user input 405 by the first user. The second user input 405 may be associated with the current dialog session. In particular embodiments, the assistant system 140 may identify a second language register associated with the first user based on the second user input 405. The assistant system 140 may then access the plurality of language-register models associated with the plurality of language registers stored in the data store. The assistant system 140 may select a second language-register model from the plurality of language-register models based on the identified second language register. In particular embodiments, the assistant system 140 may further generate a second communication content responsive to the second user input 405. The second communication content may be personalized for the first user based on the selected second language-register model. As an example and not by way of limitation, the user may be talking with his/her friend about going to a party at the beginning of the conversation but may switch to talking about applying for a job later in the conversation, which may lead to a change of the language register. The assistant system 140 may be able to detect such change and dynamically select another language-register model to generate a communication content that the user would use. Although this disclosure describes responding to a changed language register in a particular manner, this disclosure contemplates responding to any suitable language registers in any suitable manner.

In particular embodiments, the assistant system 140 may support multi-modal user input and multi-modal output to the user. As an example and not by way of limitation, the first user input 405 may comprise one or more of a character string, an audio clip, an image, a video, other suitable input, or any combination thereof. For example, the user may speak to the assistant system 140. As another example and not by way of limitation, the generated first communication content may comprise one or more of a character string, an audio clip, an image, a video, other suitable input, or any combination thereof. For example, the assistant system 140 may generate an audio message and read aloud to the user. Although this disclosure describes supporting particular modalities in a particular manner, this disclosure contemplates supporting any suitable modalities in any suitable manner.

Figure 5:
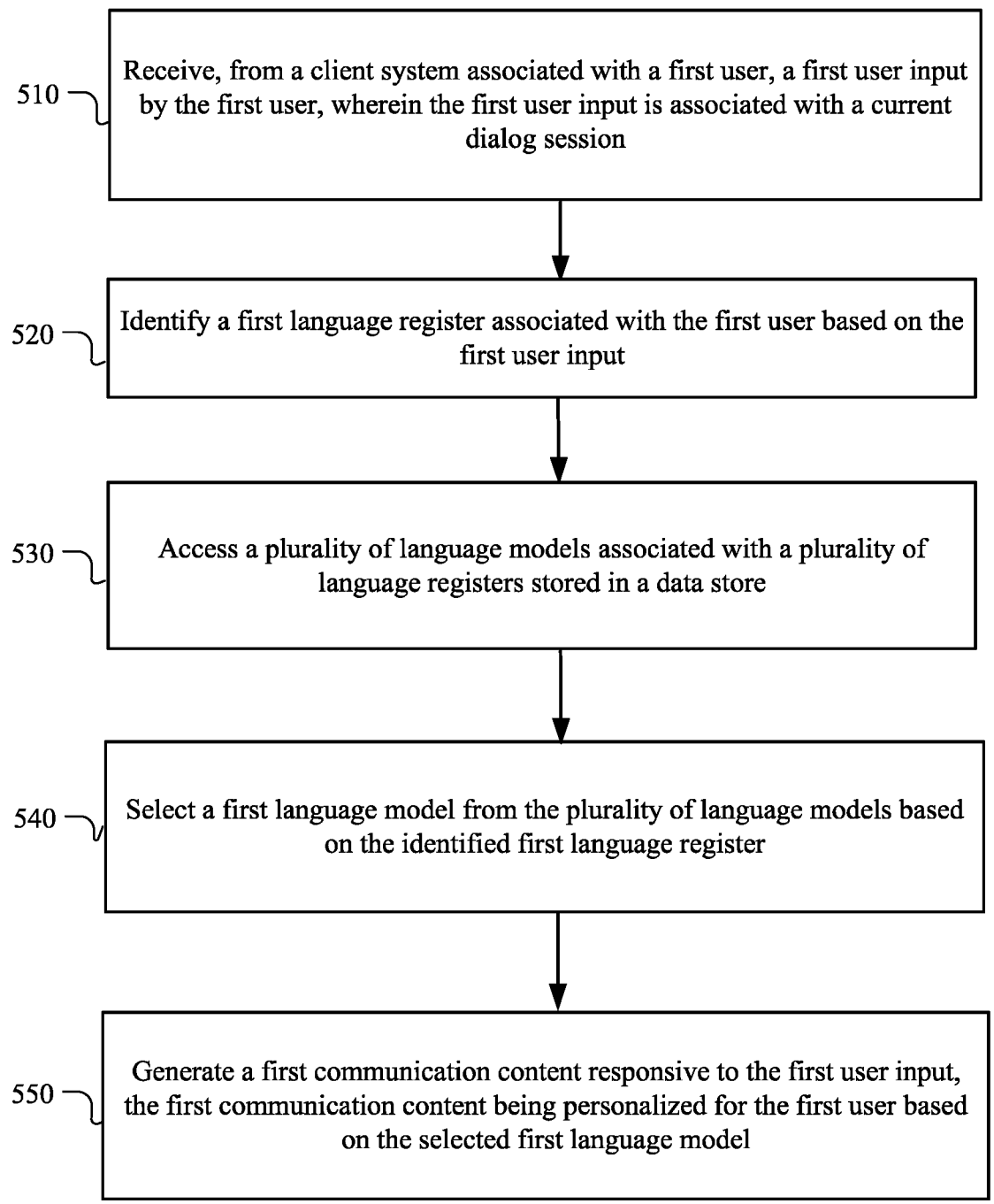
FIG. 5 illustrates an example method for generating a communication content responsive to a user input.

FIG. 5 illustrates an example method 500 for generating a communication content responsive to a user input 405. The method may begin at step 510, where the assistant system 140 may receive, from a client system 130 associated with a first user, a first user input 405 by the first user, wherein the first user input 405 is associated with a current dialog session. At step 520, the assistant system 140 may identify a first language register associated with the first user based on the first user input 405. At step 530, the assistant system 140 may access a plurality of language-register models associated with a plurality of language registers stored in a data store. At step 540, the assistant system 140 may select a first language-register model from the plurality of language-register models based on the identified first language register. At step 550, the assistant system 140 may generate a first communication content responsive to the first user input 405, the first communication content being personalized for the first user based on the selected first language-register model. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a communication content responsive to a user input, including the particular steps of the method of FIG. 5, this disclosure contemplates any suitable method for generating a communication content responsive to a user input, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graphs

Figure 6:
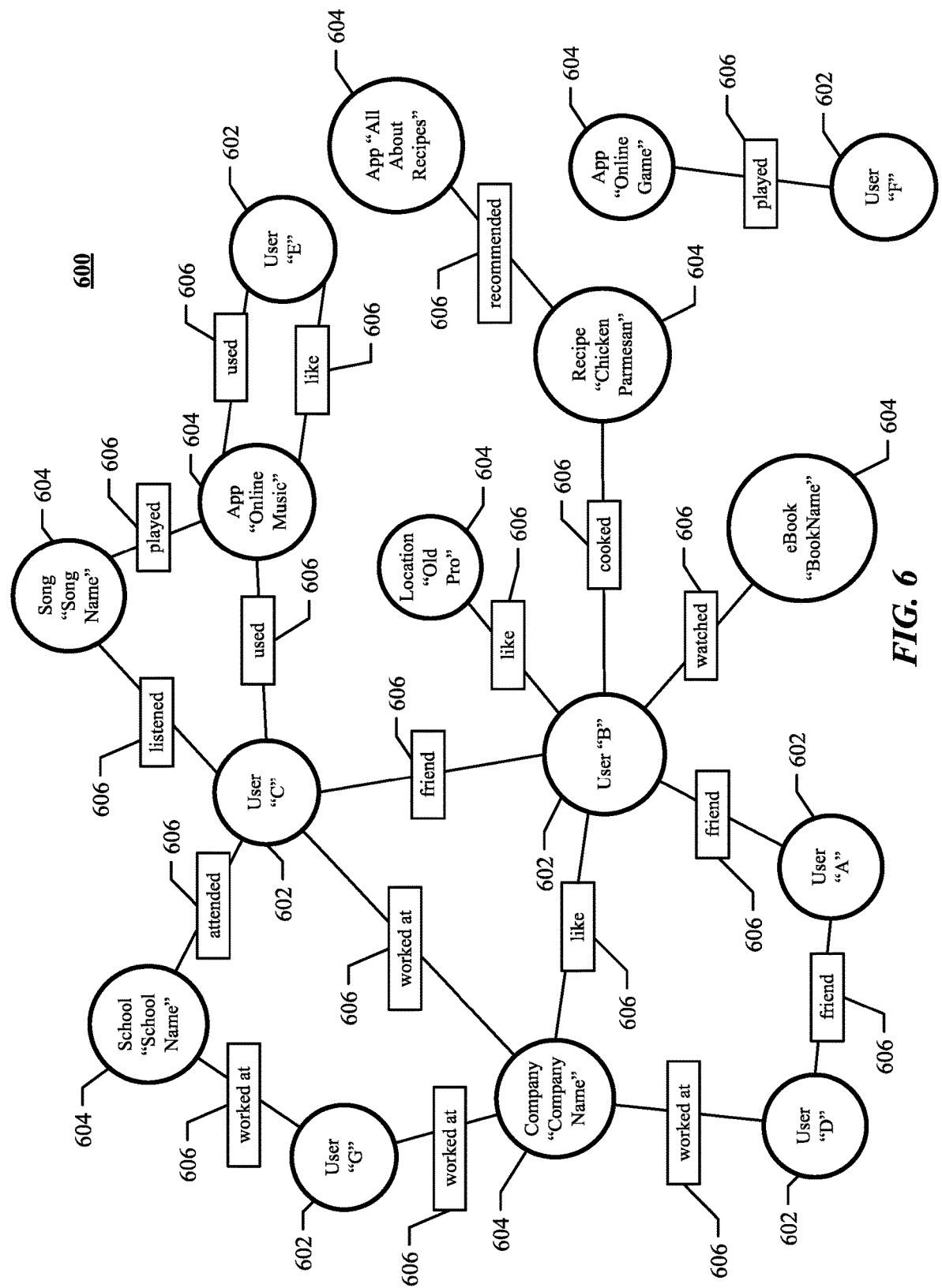
FIG. 6 illustrates an example social graph.

FIG. 6 illustrates an example social graph 600. In particular embodiments, the social-networking system 160 may store one or more social graphs 600 in one or more data stores. In particular embodiments, the social graph 600 may include multiple nodes—which may include multiple user nodes 602 or multiple concept nodes 604—and multiple edges 606 connecting the nodes. Each node may be associated with a unique entity (i.e., user or concept), each of which may have a unique identifier (ID), such as a unique number or username. The example social graph 600 illustrated in FIG. 6 is shown, for didactic purposes, in a two-dimensional visual map representation. In particular embodiments, a social-networking system 160, a client system 130, an assistant system 140, or a third-party system 170 may access the social graph 600 and related social-graph information for suitable applications. The nodes and edges of the social graph 600 may be stored as data objects, for example, in a data store (such as a social-graph database). Such a data store may include one or more searchable or queryable indexes of nodes or edges of the social graph 600.

In particular embodiments, a user node 602 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with the social-networking system 160. In particular embodiments, a user node 602 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more web interfaces.

In particular embodiments, a concept node 604 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 604 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 404. In particular embodiments, a concept node 404 may correspond to one or more web interfaces.

In particular embodiments, a node in the social graph 600 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 604. Profile interfaces may be viewable by all or a selected subset of other users. As an example and not by way of limitation, a user node 602 may have a corresponding user-profile interface in which the corresponding user may add content, make declarations, or otherwise express himself or herself. As another example and not by way of limitation, a concept node 404 may have a corresponding concept-profile interface in which one or more users may add content, make declarations, or express themselves, particularly in relation to the concept corresponding to concept node 604.

In particular embodiments, a concept node 604 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 402 corresponding to the user and a concept node 604 corresponding to the third-party web interface or resource and store edge 606 in one or more data stores.

In particular embodiments, a pair of nodes in the social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 606 connecting the first user's user node 602 to the second user's user node 602 in the social graph 600 and store edge 606 as social-graph information in one or more of data stores 166. In the example of FIG. 6, the social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 600 by one or more edges 606.

In particular embodiments, an edge 606 between a user node 602 and a concept node 606 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype.

A concept-profile interface corresponding to a concept node 604 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("SongName") using a particular application (an online music application). In this case, the social-networking system 160 may create a "listened" edge 406 and a "used" edge (as illustrated in FIG. 6) between user nodes 602 corresponding to the user and concept nodes 604 corresponding to the song and application to indicate that the user listened to the song and used the application. Moreover, the social-networking system 160 may create a "played" edge 606 (as illustrated in FIG. 6) between concept nodes 604 corresponding to the song and the application to indicate that the particular song was played by the particular application. In this case, "played" edge 606 corresponds to an action performed by an external application on an external audio file (the song "SongName"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604).

In particular embodiments, the social-networking system 160 may create an edge 406 between a user node 602 and a concept node 604 in the social graph 600. As an example and not by way of limitation, a user viewing a concept-profile interface (such as, for example, by using a web browser or a special-purpose application hosted by the user's client system 130) may indicate that he or she likes the concept represented by the concept node 604 by clicking or selecting a "Like" icon, which may cause the user's client system 130 to send to the social-networking system 160 a message indicating the user's liking of the concept associated with the concept-profile interface. In response to the message, the social-networking system 160 may create an edge 606 between user node 602 associated with the user and concept node 604, as illustrated by "like" edge 606 between the user and concept node 604. In particular embodiments, the social-networking system 160 may store an edge 606 in one or more data stores. In particular embodiments, an edge 606 may be automatically formed by the social-networking system 160 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Vector Spaces and Embeddings

Figure 7:
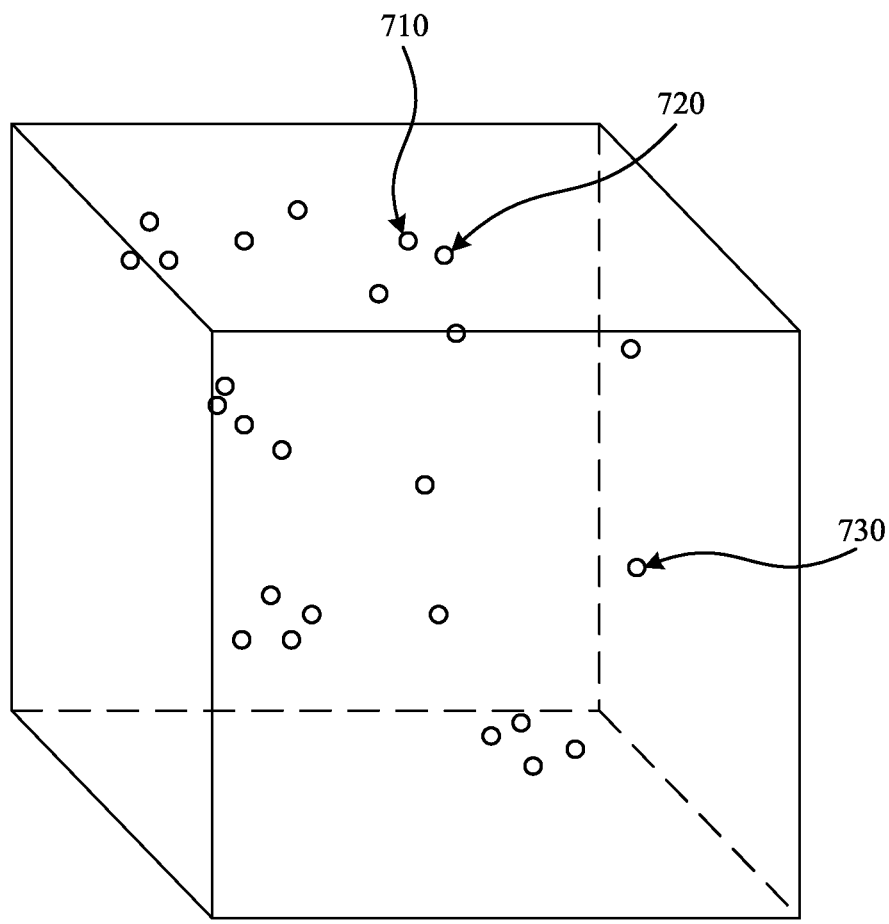
FIG. 7 illustrates an example view of an embedding space.

FIG. 7 illustrates an example view of a vector space 700. In particular embodiments, an object or an n-gram may be represented in a d-dimensional vector space, where d denotes any suitable number of dimensions. Although the vector space 700 is illustrated as a three-dimensional space, this is for illustrative purposes only, as the vector space 700 may be of any suitable dimension. In particular embodiments, an n-gram may be represented in the vector space 700 as a vector referred to as a term embedding. Each vector may comprise coordinates corresponding to a particular point in the vector space 700 (i.e., the terminal point of the vector). As an example and not by way of limitation, vectors 710, 720, and 750 may be represented as points in the vector space 700, as illustrated in FIG. 7. An n-gram may be mapped to a respective vector representation. As an example and not by way of limitation, n-grams $t_1$ and $t_2$ may be mapped to vectors $\vec{v_1}$ and $\vec{v_2}$ in the vector space 700, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 700. In particular embodiments, an n-gram may be mapped to a vector representation in the vector space 700 by using a machine leaning model (e.g., a neural network). The machine learning model may have been trained using a sequence of training data (e.g., a corpus of objects each comprising n-grams).

In particular embodiments, an object may be represented in the vector space 700 as a vector referred to as a feature vector or an object embedding. As an example and not by way of limitation, objects $e_1$ and $e_2$ may be mapped to vectors $\vec{v_1}$ and $\vec{v_2}$ in the vector space 700, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 700. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 700. As an example and not by way of limitation, vector 710 and vector 720 may correspond to objects that are more similar to one another than the objects corresponding to vector 710 and vector 750, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 8:
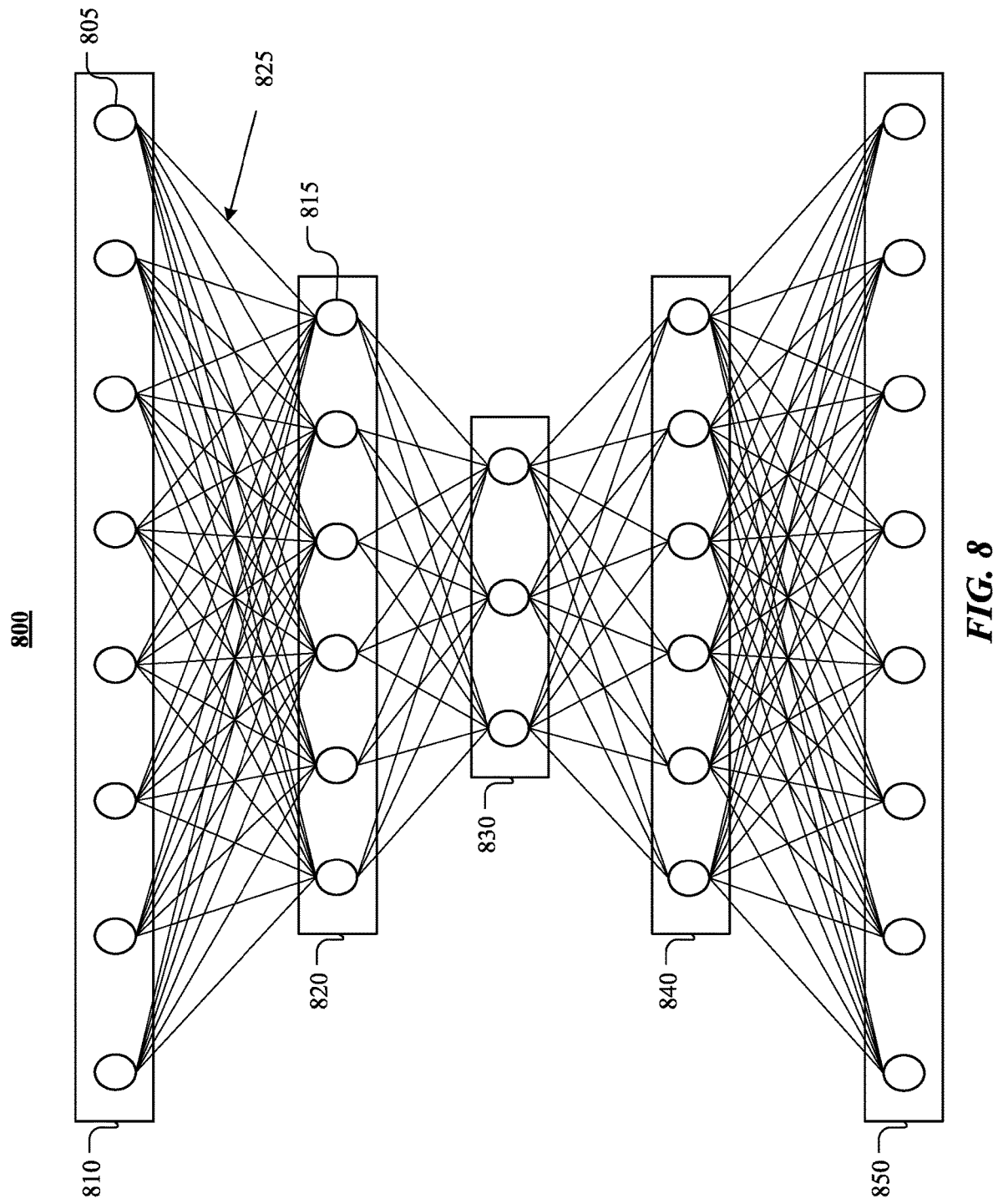
FIG. 8 illustrates an example artificial neural network.

FIG. 8 illustrates an example artificial neural network ("ANN") 800. In particular embodiments, an ANN may refer to a computational model comprising one or more nodes. Example ANN 800 may comprise an input layer 810, hidden layers 820, 830, 860, and an output layer 850. Each layer of the ANN 800 may comprise one or more nodes, such as a node 805 or a node 815. In particular embodiments, each node of an ANN may be connected to another node of the ANN. As an example and not by way of limitation, each node of the input layer 810 may be connected to one of more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 860. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max (0, $s_k$), or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 825 between the node 805 and the node 815 may have a weighting coefficient of 0.4, which may indicate that 0.4 multiplied by the output of the node 805 is used as an input to the node 815. As another example and not by way of limitation, the output $y_k$ of node k may be $y_k=F_k(s_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN800 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 404 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 400. A privacy setting may be specified for one or more edges 606 or edge-types of the social graph 600, or with respect to one or more nodes 602, 604 or node-types of the social graph 600. The privacy settings applied to a particular edge 606 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 604 connected to a user node 602 of the first user by an edge 606. The first user may specify privacy settings that apply to a particular edge 606 connecting to the concept node 604 of the object, or may specify privacy settings that apply to all edges 606 connecting to the concept node 604. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User Authentication and Experience Personalization Information In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 9:
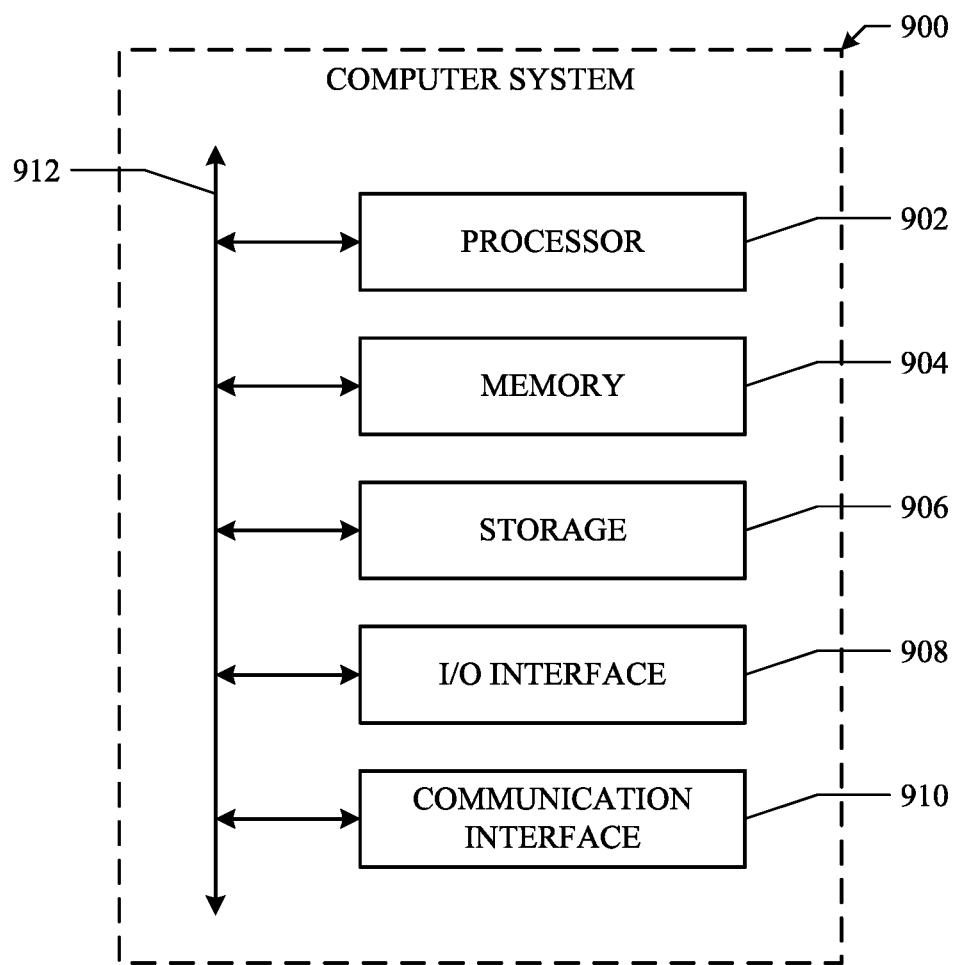
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving one or more voice inputs from a first user;
   determining a first language register associated with the first user based on the one or more voice inputs;
   selecting a second language register for a voice response based on the one or more voice inputs;
   generating, by a selected language-register model from a plurality of language-register models corresponding to a plurality of language registers, respectively, the voice response based on the second language register, wherein the selected language-register model corresponds to the second language register, wherein the plurality of language-register models are each trained based on a plurality of groups of training samples, respectively, and wherein the plurality of groups of training samples correspond to the plurality of language registers, respectively; and
   providing the voice response in response to the one or more voice inputs,
   wherein the plurality of language register models are each personalized with respect to the first user, and wherein the voice response is personalized with respect to the first user.

2. The method of claim 1, wherein the first language register and the second language register are the same language register.

3. The method of claim 1, wherein the first language register and the second language register are different language registers.

4. The method of claim 1, wherein the plurality of language register models are trained based on a word-embedding model.

5. The method of claim 4, wherein the word-embedding model is based on a convolutional neural network.

6. The method of claim 1, wherein the plurality of groups of training samples are associated with the first user, the training samples in each of the plurality of groups comprising one or more of news feed posts, news feed comments, a user profile, or messages.

7. The method of claim 6, wherein the plurality of groups corresponds to one or more criteria, wherein the one or more criteria comprise one or more of age, relationship, location, education, interest, or native language, and wherein each group is associated with a language register model for the group.

8. The method of claim 1, further comprising:
   identifying an intent and one or more slots associated with the one or more voice inputs;
   determining an action based on the identified intent;
   executing the action to retrieve information associated with the one or more slots from one or more information sources;
   accessing a plurality of language-generation templates stored in a data store, wherein each language-generation template comprises one or more slots corresponding to the one or more slots; and
   selecting a language-generation template from the plurality of language-generation templates based on the identified intent.

9. The method of claim 8, wherein the one or more information sources comprise one or more of:
   one or more first-party agents; or
   one or more third-party agents.

10. The method of claim 8, wherein the voice response is generated further based on the retrieved information and the selected language-generation template.

11. The method of claim 10, wherein generating the voice response comprises:
    generating a list of candidate words based on the second language register and the retrieved information;
    pruning the list of candidate words; and
    inserting, from the pruned list of candidate words, one of the candidate words into each slot of the selected language-generation template.

12. The method of claim 1, wherein determining the first language register or selecting the second language register is further based on a machine-learning model.

13. The method of claim 1, wherein the first user is in a current dialog session with a second user, and wherein the current dialog session comprises a message thread between the first user and the second user.

14. The method of claim 13, wherein the voice response is operable to allow the first user to select the voice response, wherein the method further comprises:
    receiving a selection of the voice response from the first user; and
    inserting the voice response in the message thread between the first user and the second user.

15. The method of claim 1, wherein the first user is in a current dialog session with an assistant xbot, and wherein the current dialog session comprises a message thread between the first user and the assistant xbot.

16. The method of claim 15, further comprising:
    inserting the voice response in the message thread between the first user and the assistant xbot.

17. The method of claim 1, further comprising identifying the second language register, wherein the identifying comprises:
    generating a first feature vector representing the one or more voice inputs;

accessing a plurality of second feature vectors representing the plurality of language registers stored in a data store;

calculating a plurality of similarity scores between the first feature vector and the respective second feature vector; and identifying the second language register based on the plurality of similarity scores.

18. One or more computer-readable non-transitory storage media embodying software that is operable when executed to:

receive one or more voice inputs from a first user;

determine a first language register associated with the first user based on the one or more voice inputs;

select a second language register for a voice response based on the one or more voice inputs;

generate, by a selected language-register model from a plurality of language-register models corresponding to a plurality of language registers, respectively, the voice response based on the second language register, wherein the selected language-register model corresponds to the second language register, wherein the plurality of language-register models are each trained based on a plurality of groups of training samples, respectively, and wherein the plurality of groups of training samples correspond to the plurality of language registers, respectively; and provide the voice response in response to the one or more voice inputs, wherein the plurality of language register models are each personalized with respect to the first user, and wherein the voice response is personalized with respect to the first user.

19. A system comprising: one or more processors; and a non transitory memory coupled to the processors comprising instructions executable by the processors, the processors operable when executing the instructions to:

receive one or more voice inputs from a first user;

determine a first language register associated with the first user based on the one or more voice inputs;

select a second language register for a voice response based on the one or more voice inputs;

generate, by a selected language-register model from a plurality of language-register models corresponding to a plurality of language registers, respectively, the voice response based on the second language register, wherein the selected language-register model corresponds to the second language register, wherein the plurality of language-register models are each trained based on a plurality of groups of training samples, respectively, and wherein the plurality of groups of training samples correspond to the plurality of language registers, respectively; and provide the voice response in response to the one or more voice inputs, wherein the plurality of language register models are each personalized with respect to the first user, and wherein the voice response is personalized with respect to the first user.

* * * * *